3,075,804
FOLDABLE ROOF CONSTRUCTION, ESPECIALLY FOR MOTOR VEHICLES
Friedrich Geiger, Boblingen, and Walter Dalheimer and Adolf Schmidt, Sindelfingen, Kreis Boblingen, Germany, assignors to Daimler-Benz Aktiengesellschaft, Stuttgart-Unterturkheim, Germany
Filed Mar. 1, 1960, Ser. No. 12,114
Claims priority, application Germany, Mar. 5, 1959
6 Claims. (Cl. 296—107)

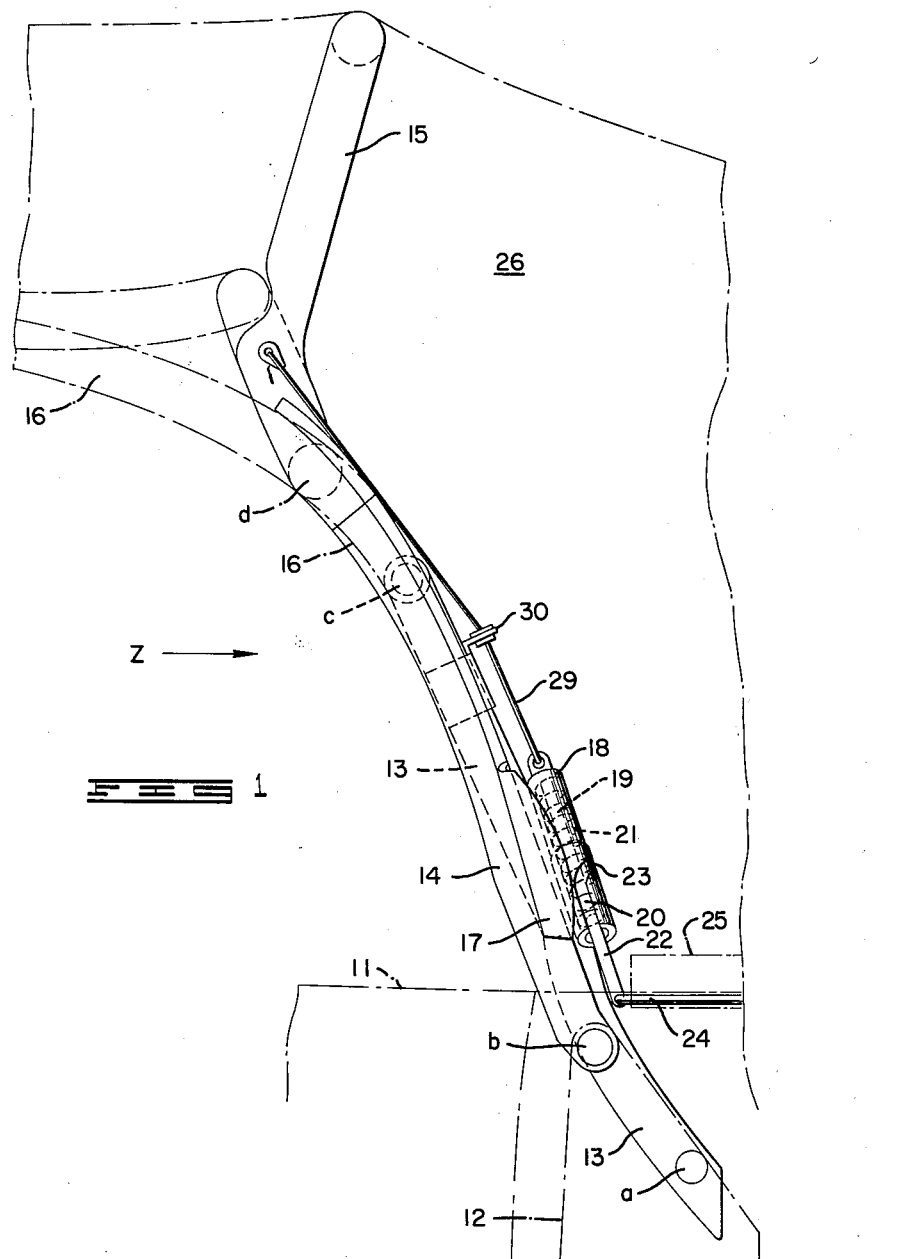

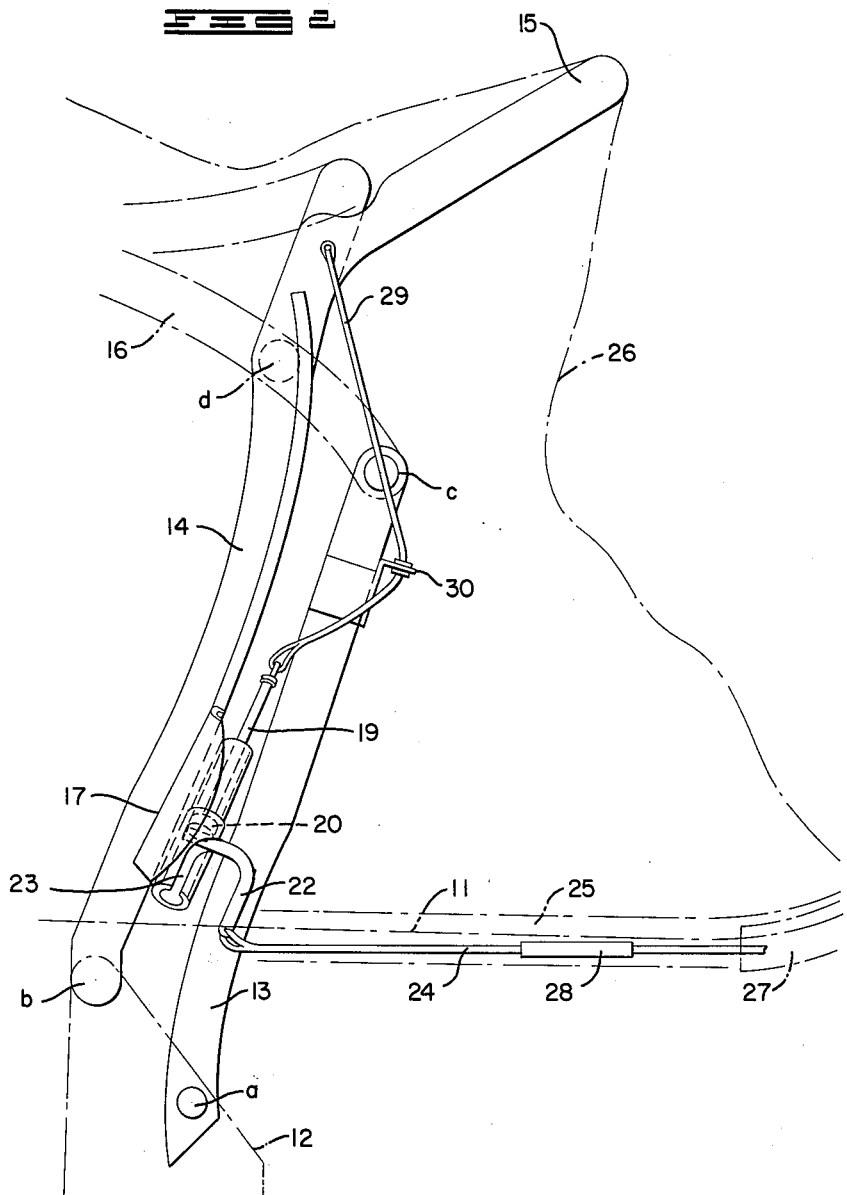

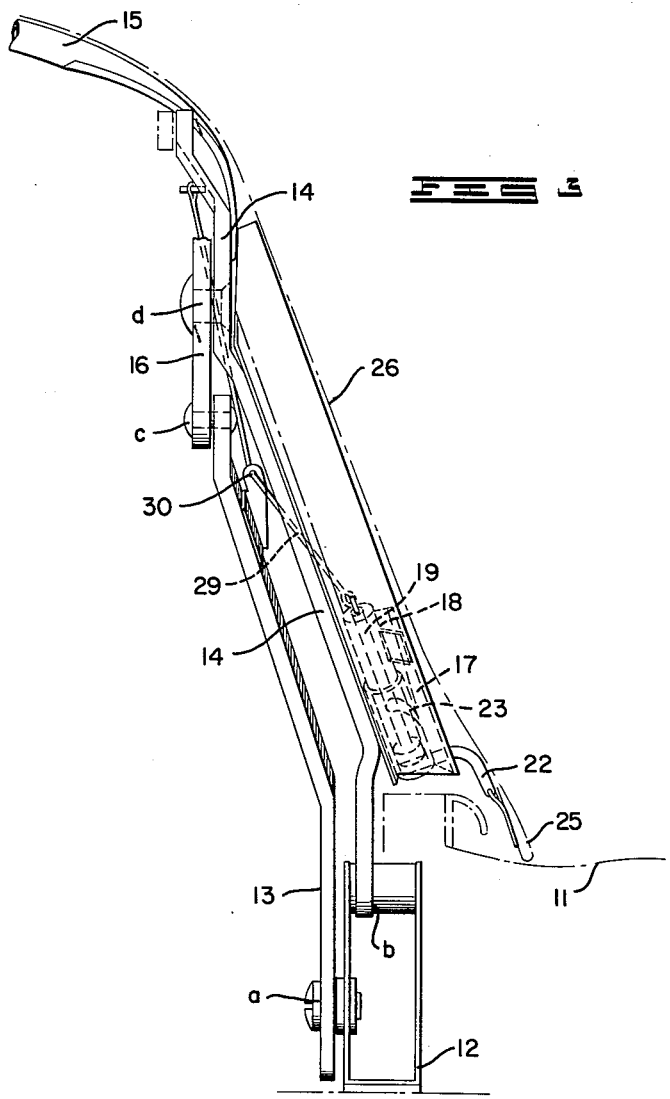

The present invention relates to a support arrangement for the cover of a collapsible or foldable roof, particularly of the two lateral parts thereof, at the relatively stationary vehicle superstructure, especially in motor vehicles, and has as its object a special arrangement by means of which the particular, desired support of the foldable roof in accordance with the present invention is achieved.

Difficulties arise normally in connection with foldable roof covers which are adapted to be accommodated in the lowered or folded condition thereof within the rear of the vehicle to secure the two lateral parts of the roof cover, i.e. the tips thereof at the vehicle superstructure when the roof is raised in such a manner that they abut tightly against the vehicle superstructure. The reason for this difficulty lies in the fact that the lateral parts of the roof cover in the raised condition of the roof are either not subjected to any tensional forces at all, or are subjected to tensional forces only very slightly, since the direction of the tensional force present within the roof cover extends primarily in the longitudinal direction of the vehicle by reason of the locking means disposed forwardly at the windshield frame. As a result thereof, such tension has no tightening effect whatsoever on the lateral parts of the roof cover, or only affects the lateral parts of the roof in a totally insufficient manner.

The lower corners of the side parts of the roof cover are ordinarily secured at the vehicle superstructure, in the prior art constructions, by means of snap-fasteners or the like. However, this type of securing does not bring about the required sealing between the lower edge of the roof within the lateral regions of the roof cover and the vehicle superstructure in order to prevent effectively, especially with relatively high vehicle speeds, the penetration of draft and of dampness or humidity.

In order to obviate these shortcomings and disadvantages of the prior art, it is proposed, in accordance with the present invention, to tighten additionally the two lateral parts of the cover of the foldable roof or the lower edges thereof either in themselves or against the outer body walls of the vehicle superstructure in the raised condition of the roof by means of a separate tightening and tensioning mechanism.

According to a further feature of the present invention, it is proposed to construct this separate tensioning mechanism in such a manner that, upon raising the roof, the two lateral parts or the lower edges of the cover are automatically tensioned or tightened by the separate tensioning mechanism and that the ensuing tensional force is automatically released again during folding or lowering of the roof.

By the use of the arrangement in accordance with the present invention, an abutment of the lower edge of the two lateral parts of the roof along the outer body walls of the vehicle superstructure, caused by the tightening or tensioning forces, is achieved so that even with roof covers adapted to be completely lowered, the existence of the endangered sections of the roof, as regards the connection and/or the seal of the roof cover with respect to or against the vehicle superstructure, is effectively eliminated. Furthermore, the additionally tensioned, taut lateral parts of the roof provide a better assurance for a rapid and completely satisfactory and unobjectional drainage of the water along the roof cover.

Accordingly, it is an object of the present invention to provide a foldable roof construction, especially for motor vehicles, which eliminates the disadvantages and shortcomings of the prior art devices and which assures a good sealing engagement between the lower edge portions of the lateral roof cover parts with respect to the vehicle superstructure.

Still another object of the present invention is the provision of a lowerable, foldable roof for convertibles in which a good, tight seal of those roof parts is assured which abut against the vehicle superstructure, especially of the lower lateral edge portions of the roof.

Still another object of the present invention resides in the provision of a separate tensioning means for a foldable roof of motor vehicles which assures a tight and snug abutment of the edge portions of the roof cover against the body walls in the raised position of the roof.

Another object of the present invention resides in the provision of a foldable roof provided with separate tensioning means so arranged as to guarantee a rapid and satisfactory shedding of the rain water due to the tautness of the roof cover.

These and other objects, features and advantages of the present invention will become more obvious from the following description, when taken in connection with the accompanying drawing which shows, for purposes of illustration only, one embodiment in accordance with the present invention and wherein FIGURE 1 is a side elevational view of the rear part of the roof cover and of the roof support members in the raised position of the roof cover;

FIGURE 2 is a side elevational view of the rear part of the roof cover and of the roof support members of FIGURE 1 during folding or collapsing of the roof cover, and FIGURE 3 is a front elevational view of the roof structure of FIGURE 1 taken in the direction of arrow Z.

Referring now to the drawing, wherein like reference numerals are used throughout the various views to designate corresponding parts, reference numeral 11 (FIGURES 1, 2 and 3) designates therein the vehicle superstructure, shown only schematically, which may consist of the vehicle frame and/or of the vehicle body, for example of a self-supporting type body construction including outer body walls. The bearing bracket 12 (FIGURE 3) for the roof support members is rigidly connected with or formed in part by the vehicle superstructure 11 and supports therein the main guide arm 13 by means of pivot bearing $a$ as well as the collapsing column 14 by means of pivot bearing $b$, whereby the main transverse brace 15 is rigidly secured to the upper part of the collapsing column 14.

An angle lever 16 (FIGURES 1, 2 and 3) is pivotally secured at $c$ to the upper end of the main guide arm 13 in any suitable known manner which angle lever 16 engages forwardly thereof at the roof frame (not shown) in any suitable, conventional manner. Additionally, the angle lever 16 is rotatably connected with the collapsing column 14 at pivot bearing $d$.

A spring bushing or sleeve 18 is rigidly secured at the collapsing column 14 by means of a securing sheet metal member 17. A piston rod 19 provided with a piston 20, which also serves as abutment disk for a coil spring 21, slides within the sleeve 18 constituting the bearing cylinder therefor. The spring 21 is thereby installed within sleeve 18 with a certain pre-tension. A hook-shaped lever 22 is rigidly secured to the spring disk 20 which lever 22 is guided within a guide slot 23 or a similar guide arrangement provided in the sleeve 18. One end of the tightening cable or cord 24 is secured to the outer end of lever 22 which tightening cord 24 is inserted into the seam or edge 25 of the lateral cover parts 26 of the roof cover and the other end of which is securely fastened with the reinforced rim 27 (FIGURE 2) of the roof tensioning and tightening mechanism. A cord tensioning device 28 is provided in the cord 24, for example, in the form of a threaded sleeve provided with two oppositely directed threaded sections so that the length of the cord 24 may be readily adjusted with the aid thereof by rotating the threaded sleeve as is well known.

A pull cord 29 is secured to the upper end of the piston rod 19 which is guided through an eyelet 30 arranged at the main guide arm 13 and the upper end of which is secured at the collapsing column 14 near the main transverse brace or support member 15.

*Operation*

In the raised condition of the roof, as illustrated in FIGURE 1, the spring disk 20 is disposed in the lowermost position thereof by reason of the force exerted thereon by the compression spring 21. At the same time, the hook-shaped lever 22 points outwardly toward the sides of the vehicle, whereby the cord 24 is tensioned or tightened so that the lateral parts 26 of the roof cover are retained at the vehicle superstructure in tight sealing relationship therewith. The tensioning force is thereby effective in such a direction that the hook-shaped lever 22 is forced against the guide slot 23 extending essentially rectilinearly upwardly within the lower region thereof so that the hook-shaped lever 22 remains in this position on its own.

During folding or collapsing of the roof, as illustrated in FIGURE 2, the piston rod 19 is automatically pulled or withdrawn out of the sleeve 18 with the aid of the cord 29 by reason of the particular configuration and outer connection of the individual roof support members 13, 14, and 16 and of the particular location of eyelet 30. At the same time, the hook-shaped lever 22 slides upwardly within the guide slot 23, at first only upwardly essentially rectilinearly, and thereupon rearwardly obliquely so that the cord 24 is untensioned or relieved, whereby nothing now prevents lowering and folding or collapsing of the roof cover.

While we have shown and described one embodiment in accordance with the present invention, it is understood that the same is not limited thereto but is susceptible of many changes and modifications within the spirit and scope of the present invention. For example, instead of cords 24 and 29, any other suitable actuating means such as cables, wires or the like may be used. Additionally, the particular arrangement of the various parts need not necessarily be as shown and described herein but may be varied therefrom as long as the control functions are achieved thereby which are necessary for purposes of proper operation as indicated hereinabove.

Thus, it is obvious that the present invention is capable of many changes and modifications within the spirit and scope thereof and we, therefore, do not wish to be limited by the details shown and described herein but intend to cover all such changes and modifications as are encompassed by the scope of the appended claims.

We claim:

1. A support arrangement for a foldable roof, especially for motor vehicles having a vehicle superstructure, comprising foldable roof cover means including lateral cover parts, support means including a plurality of support members movable relative to each other for said cover means for selectively supporting the same in the raised position thereof and operative to enable folding thereof, and separate tensioning means for tensioning said lateral parts with said cover means in the raised position thereof to thereby assure tight sealing abutment of said lateral parts against said vehicle superstructure including actuating means operatively connected with one of said supporting members for automatically actuating said separate tensioning means during raising and lowering of said cover means, said actuating means including a bushing provided with a guide slot and rigidly connected with said one support member, a spring-loaded piston member slidingly accommodated within said bushing and provided with a piston rod, first connecting means operatively connecting said piston rod with one of said supporting members in such a manner that during collapsing of said cover means said piston member is moved in one direction, an essentially hook-shaped member secured to said piston member and guided within said guide slot, and second connecting means connected at one end thereof with said hook-shaped member and at the other end thereof to the rear rim portion of said cover means.

2. A support arrangement for a foldable roof according to claim 1, wherein said second means is inserted into the lower edge of said cover parts.

3. A support arrangement for a foldable roof according to claim 1, wherein said plurality of support members include a main guide arm provided with an eyelet, and a collapsing member, said first connecting means extending through said eyelet and being secured to the upper end of said collapsing member, the relationship between the upper securing point of said first connecting means at said collapsing member, the location of said eyelet, and the lower securing point of said first connecting means with said piston rod being such that during collapsing of said cover means the distance from said upper securing point over said eyelet to said lower securing point increases to thereby pull said piston rod partly out of said bushing and therewith pivot said hook-shaped member guided within said guide slot in such a manner as to release the tension in said second connecting means.

4. A support arrangement for a foldable roof according to claim 3, wherein said guide slot provided in said bushing commences laterally in the lower part thereof and extends subsequently upwardly rearwardly, as viewed from the side of a vehicle.

5. A support arrangement for a foldable roof according to claim 4, wherein said hook-shaped member is automatically retained in the lower upwardly extending end of said guide slot with said roof in the raised position thereof by the force acting on said hook-shaped member in a direction perpendicular to the lower end of said guide slot.

6. A support arrangement for a foldable roof, especially for motor vehicles, having a vehicle superstructure, comprising foldable roof cover means including lateral parts, and support means for selectively supporting said cover means in the raised position thereof and operative to enable folding thereof, said support means including auxiliary tightening means for tightening said lateral parts of said roof cover means in the raised position thereof to thereby assure tight sealing abutment of said lateral parts with respect to said vehicle superstructure, said auxiliary tightening means including a bushing, a piston member movable within said bushing, spring means for springloading said piston member, means for compressing said spring means during lowering of said roof cover means, means for maintaining said spring in its compressed position until said roof cover means is moved essentially into its raised position, tensioning means operatively engaging said lateral parts, and means connecting said piston member with said tensioning means.

References Cited in the file of this patent

UNITED STATES PATENTS

| | | |
|---|---|---|
| 359,638 | Sewell | Mar. 22, 1887 |
| 1,759,250 | Wright | May 20, 1930 |
| 1,809,505 | Campbell | June 9, 1931 |
| 2,482,323 | Cromwell et al. | Sept. 20, 1949 |
| 2,549,153 | Ackermans | Apr. 17, 1951 |
| 2,569,724 | Mackie et al. | Oct. 2, 1951 |